(12) United States Patent
Shimizu et al.

(10) Patent No.: US 10,518,612 B2
(45) Date of Patent: *Dec. 31, 2019

(54) VEHICLE SUN VISOR

(71) Applicant: Yazaki Corporation, Tokyo (JP)

(72) Inventors: Tomohiko Shimizu, Shizuoka (JP); Toshinori Yamamoto, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/012,239

(22) Filed: Jun. 19, 2018

(65) Prior Publication Data

US 2018/0370341 A1 Dec. 27, 2018

(30) Foreign Application Priority Data

Jun. 26, 2017 (JP) .................................. 2017-124004

(51) Int. Cl.
*B60J 3/02* (2006.01)

(52) U.S. Cl.
CPC ........... *B60J 3/0217* (2013.01); *B60J 3/0252* (2013.01)

(58) Field of Classification Search
CPC ...... B60J 3/0217; B60J 3/0221; B60J 3/0252; B60Q 3/252
USPC .......................................... 296/97.12, 97.13
See application file for complete search history.

(56) References Cited

U.S. PATENT DOCUMENTS

| | | | | |
|---|---|---|---|---|
| 6,139,083 | A * | 10/2000 | Fischer .................. | B60J 3/0239 296/97.11 |
| 2002/0094719 | A1* | 7/2002 | Sawayanagi ........... | B60J 3/0221 439/545 |
| 2002/0149224 | A1* | 10/2002 | Wilson ................... | B60J 3/0217 296/97.5 |
| 2005/0104409 | A1* | 5/2005 | Garcia ................... | B60J 3/0221 296/97.9 |
| 2011/0260491 | A1 | 10/2011 | Ebisuoka | |
| 2017/0021702 | A1* | 1/2017 | Jin ......................... | B60J 3/0221 |
| 2018/0361834 | A1* | 12/2018 | Nishiyama ............. | B60J 3/0217 |
| 2018/0361835 | A1* | 12/2018 | Kawashima ........... | B60J 3/0217 |

(Continued)

FOREIGN PATENT DOCUMENTS

JP          2011-230559 A          11/2011

*Primary Examiner* — Jason S Morrow
(74) *Attorney, Agent, or Firm* — Sughrue Mion, PLLC

(57) ABSTRACT

A vehicle sun visor has a sun visor body including an electrical component, an arm including a cylindrical-end portion with contact parts of a pair of conductors and rotatably holding the sun visor body, a mounting bracket for mounting the arm to a vehicle, and a connector including a pair of terminals to contact with a corresponding contact part of the pair of conductors. On the upper side and the lower side of the cylindrical-end portion exposed outside an arm-supporting portion of the mounting bracket, a small-diameter cylindrical-end portion and a large-diameter cylindrical-end portion are provided. The small-diameter cylindrical-end portion and the large-diameter cylindrical-end portion are provided with cutouts provided at alternate positions. First arcuate plate shape contact part is arranged on an outer peripheral surface of the small-diameter cylindrical-end portion, and second arcuate plate shape contact part is arranged on an outer peripheral surface of the large-diameter cylindrical-end portion.

2 Claims, 13 Drawing Sheets

(56) References Cited

U.S. PATENT DOCUMENTS

2018/0361836 A1* 12/2018 Nishiyama ............ B60J 3/0217
2019/0061485 A1*  2/2019 Nishiyama ............ B60J 3/0217

* cited by examiner

VEHICLE SUN VISOR

CROSS REFERENCE TO RELATED APPLICATIONS

This application claims the priority of Japanese Patent Application No. 2017-124004, filed on Jun. 26, 2017, the entire content of which are incorporated herein by reference.

BACKGROUND

Technical Field

The present invention relates to a vehicle sun visor with illumination arranged in the vicinity of an upper end of a front window of a front seat of a vehicle.

Related Art

A vehicle sun visor of this type is disclosed in JP 2011-230559 A. As shown in FIG. 14, the vehicle sun visor 1 includes a non-conductive support shaft (arm) 2 for rotatably holding a sun visor body (not shown), a mounting bracket 5 for mounting the support shaft 2 to a ceiling of a vehicle cabin (not shown), and a connector 7 detachably assembled to the mounting bracket 5 and having a pair of terminals 8 and 8 for supplying electric power.

A pair of conductors 3 and 3 extending in parallel is arranged inside the support shaft 2. Each columnar conductor end portion 3a serving as the contact parts of a pair of conductors 3 and 3 is provided on the closed upper surface of an end portion 3a toward the mounting bracket 5 so as to protrude outward. The pair of columnar conductor end portions 3a and 3a is spaced apart from each other, having a space, via a non-conductive intervening portion 2b protruding to the center of the upper surface of the end portion 2a of the support shaft 2.

The end portion 2a of the support shaft 2 is rotatably supported by a cylindrical support protrusion portion 5a of the mounting bracket 5, and a housing 7a of the connector 7 is assembled to a mounting recess portion 5b of the mounting bracket 5.

When the support shaft 2 is rotated to a first position, the pair of columnar conductor end portions 3a and 3a protruding outward from the end portion 2a contacts each spring portion 8a of the pair of terminals 8 and 8 for supplying electric power to be brought into an energized (ON) state, whereby a lighting preparation state of the illumination lamp of the sun visor body is formed.

When the support shaft 2 is rotated to the second position, the pair of columnar conductor end portions 3a and 3a protruding outward from the end portion 2a is away from each spring portion 8a of the pair of terminals 8 and 8 for supplying electric power to be in a non-conducting (OFF) state.

SUMMARY

However, in the conventional vehicle sun visor 1, when the support shaft 2 rotates and reaches a certain rotation angle, the columnar conductor end portion 3a projecting outward from the end portion 2a of the support shaft 2 and plate-shaped spring portion 8a serving as a contact part of the terminal 8 assembled to the housing 7a of the connector 7 are away from each other to shut off the circuit. That is, in the conventional vehicle sun visor 1, the range of the rotation angle of the support shaft 2 that can be energized is limited.

The present invention has been made to solve this problem, and it is an object of the present invention to provide a vehicle sun visor, which can always be brought into an energized (conductive) state by widening a contact range between a contact part of a conductor of an arm and a contact part of a terminal.

A vehicle sun visor according to an aspect of the present invention has a sun visor body including an electrical component, a non-conductive arm including a cylindrical-end portion on which contact parts of a pair of conductors are arranged and rotatably holding the sun visor body, a mounting bracket configured to mount the non-conductive arm to a vehicle, and a connector detachably attached to the mounting bracket and including a pair of terminals each having a contact portion to contact with a corresponding contact part of the pair of conductors and configured to supply electric power. The mounting bracket includes an arm-supporting portion for rotatably supporting a cylindrical-end-portion side of the non-conductive arm. The contact parts of the pair of conductors are formed in an arcuate plate shape. The cylindrical-end portion exposed outside the arm-supporting portion includes a small-diameter cylindrical-end portion provided on the upper side and a large-diameter cylindrical-end portion provided on the lower side. Cutouts are provided at alternate positions of the small-diameter cylindrical-end portion and the large-diameter cylindrical-end portion. First arcuate plate shape contact part, which is one of the pair of conductive contact parts formed in arcuate plate shape, is arranged on an outer peripheral surface of the small-diameter cylindrical-end portion, and second arcuate plate shape contact part, which is the other of the pair of conductive contact parts formed in arcuate plate shape, is arranged on an outer peripheral surface of the large-diameter cylindrical-end portion.

Slits configured to store lubricating oil may be longitudinally provided at position of the first or second arcuate plate shape contact part wherein the contact portion is in contact with the first or second arcuate plate shape contact part at the position, and lubricating oil to be supplied to the contact portion may be stored in the slits.

According to the vehicle sun visor of one aspect of the present invention, the arcuate plate shape contact parts are provided on the outer peripheral surface of the small-diameter cylindrical-end portion on the upper side of the arm exposed outside the arm-supporting portion of the mounting bracket and the outer peripheral surface of the large-diameter cylindrical-end portion on the lower side of the arm exposed outside the arm-supporting portion of the mounting bracket, so that it is possible to widen the contact range between the contact part of the conductor of the arm and the contact portion of the terminal to be brought into an energized (conductive) state. In addition, cutouts are provided in alternate positions of the small-diameter cylindrical-end portion and the large-diameter cylindrical-end portion, so that deformation of the spring portion of the terminal due to interference between the spring portion of the terminal and the conductive contact part of the arm can be reliably prevented when the connector is assembled to the mounting bracket with the arm assembled thereto.

DETAILED DESCRIPTION

Figure 1:
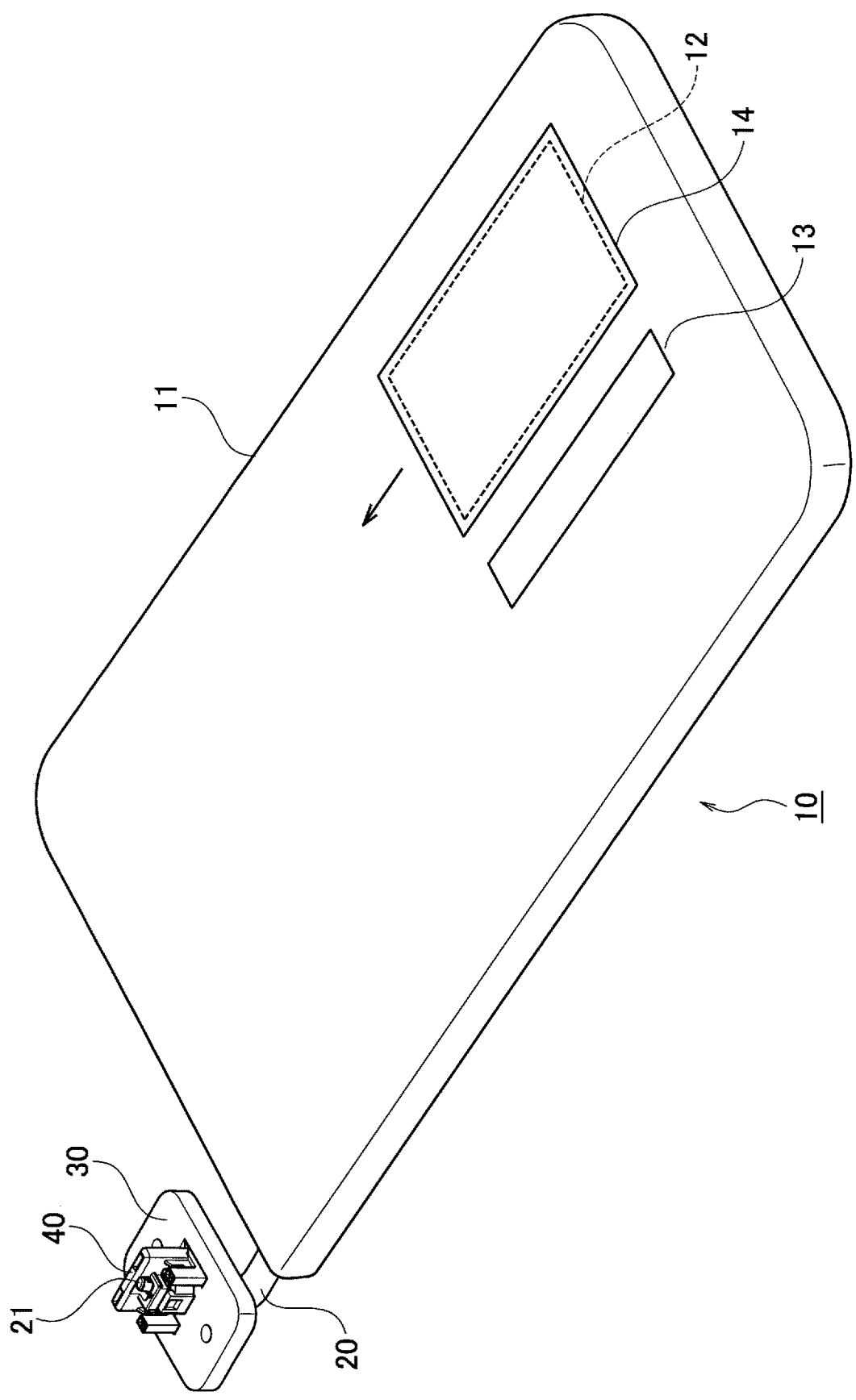
FIG. 1 is a perspective view of a vehicle sun visor according to a first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 2:
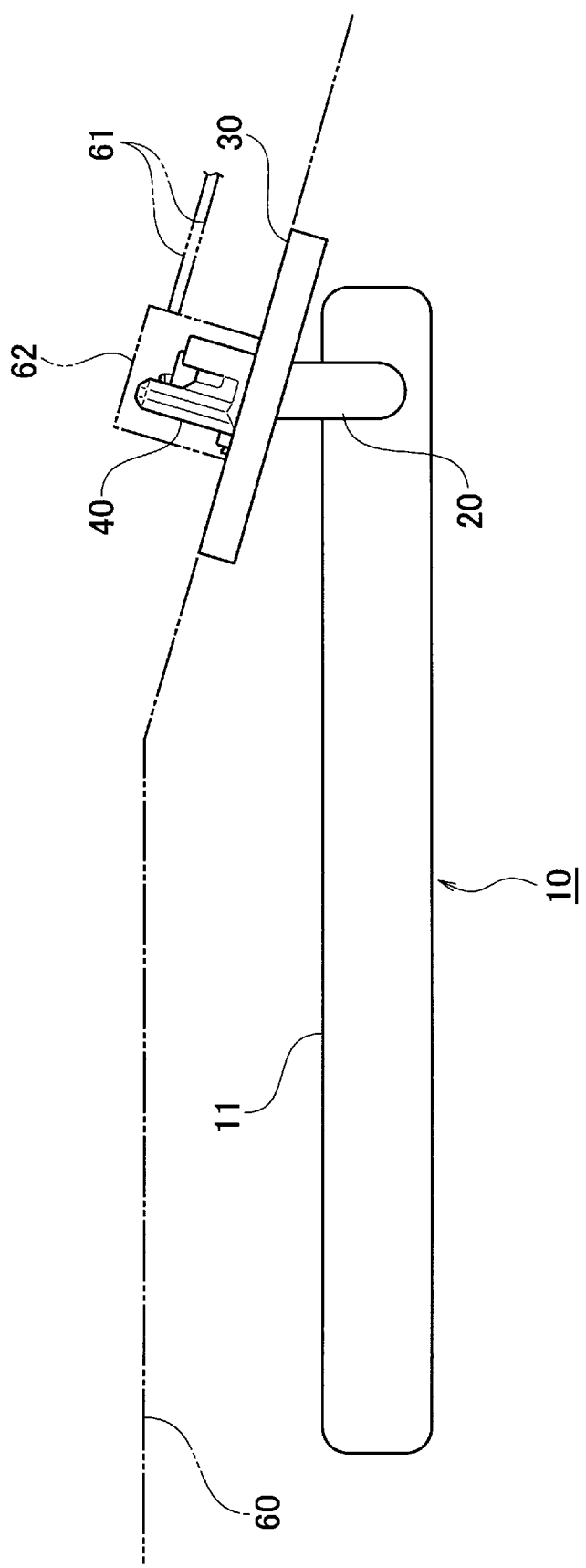
FIG. 2 is a side view showing a state in which the vehicle sun visor is stored toward a ceiling of a cabin.
Figure 3A:
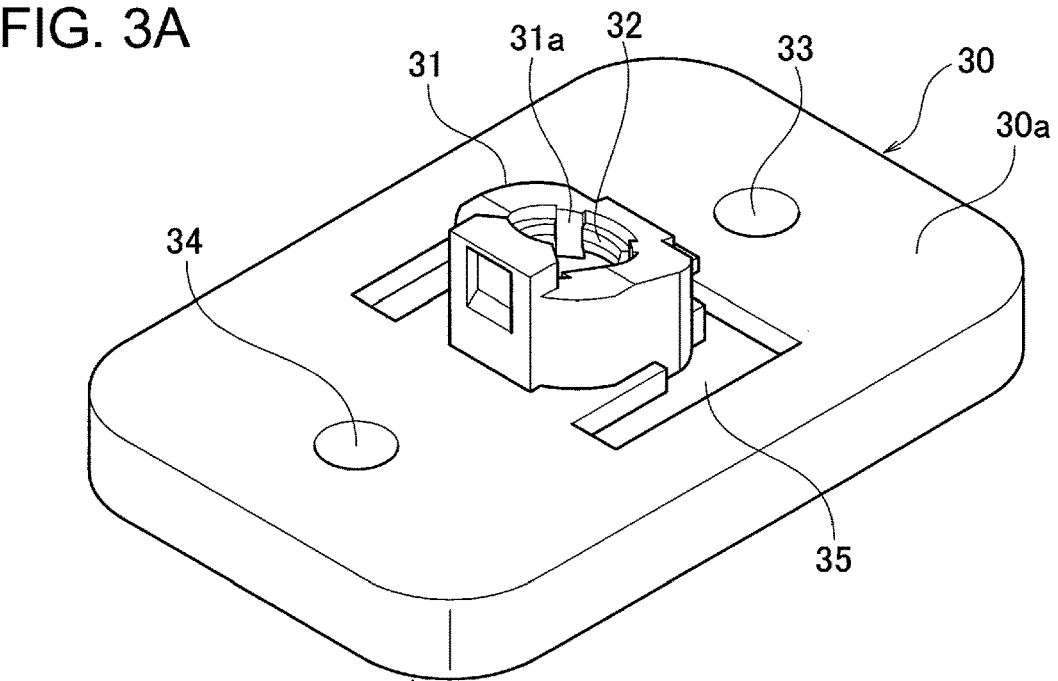
FIG. 3A is a perspective view showing a state before the cylindrical-end portion of an arm is press-fitted to a mounting bracket of the vehicle sun visor.
Figure 3B:
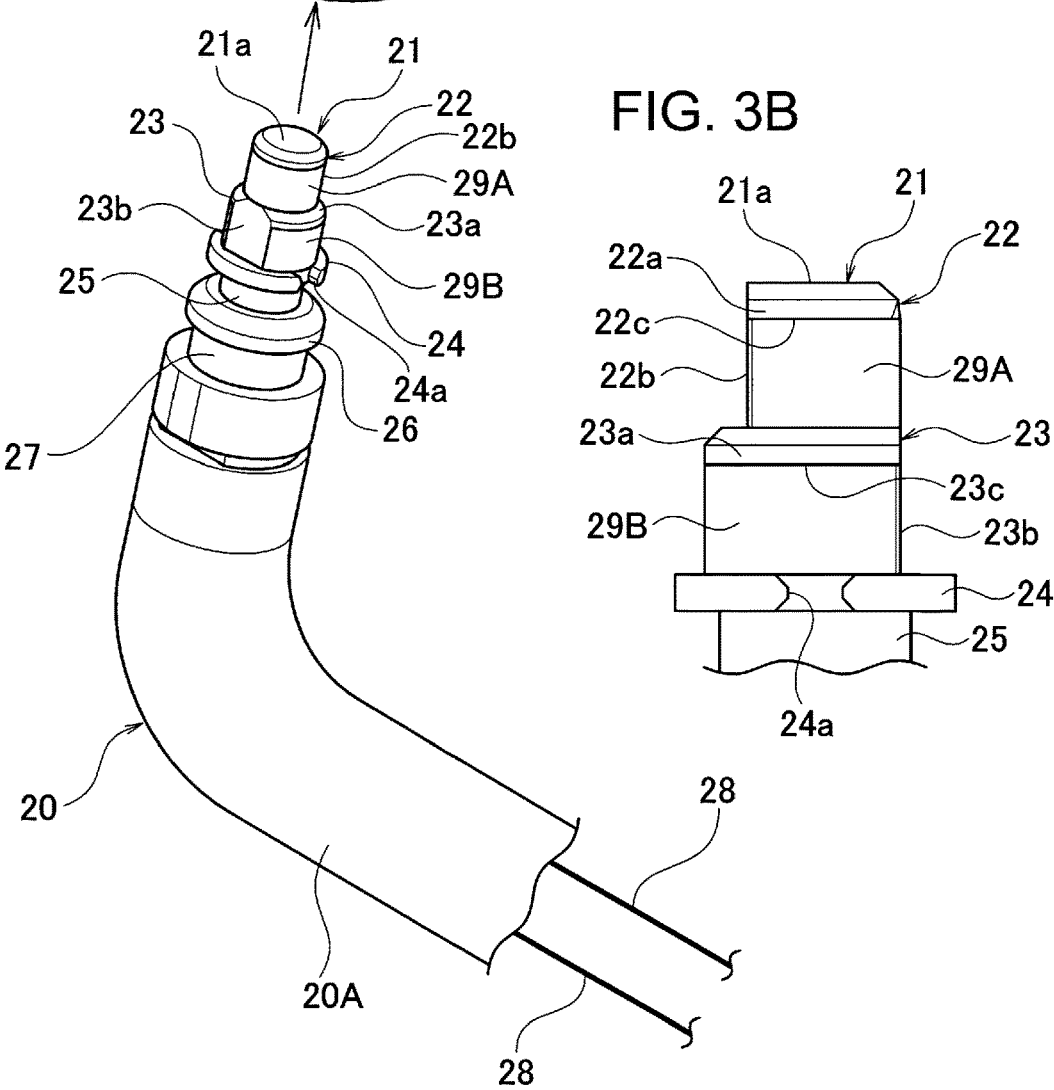
FIG. 3B is an enlarged side view of a cylindrical-end portion of the arm.
Figure 4:
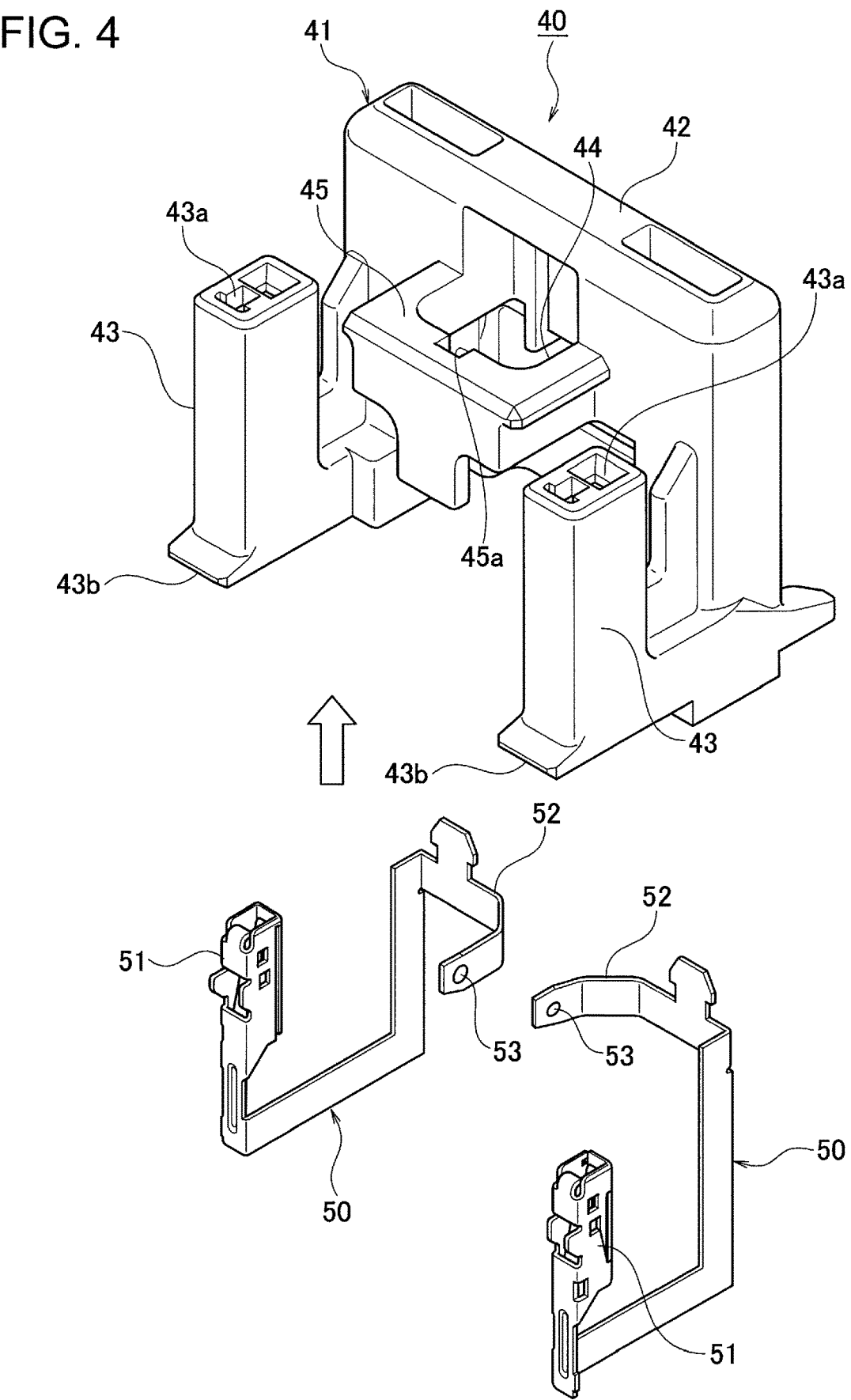
FIG. 4 is a perspective view showing a state before a pair of terminals is inserted into a connector of the vehicle sun visor.
Figure 5:
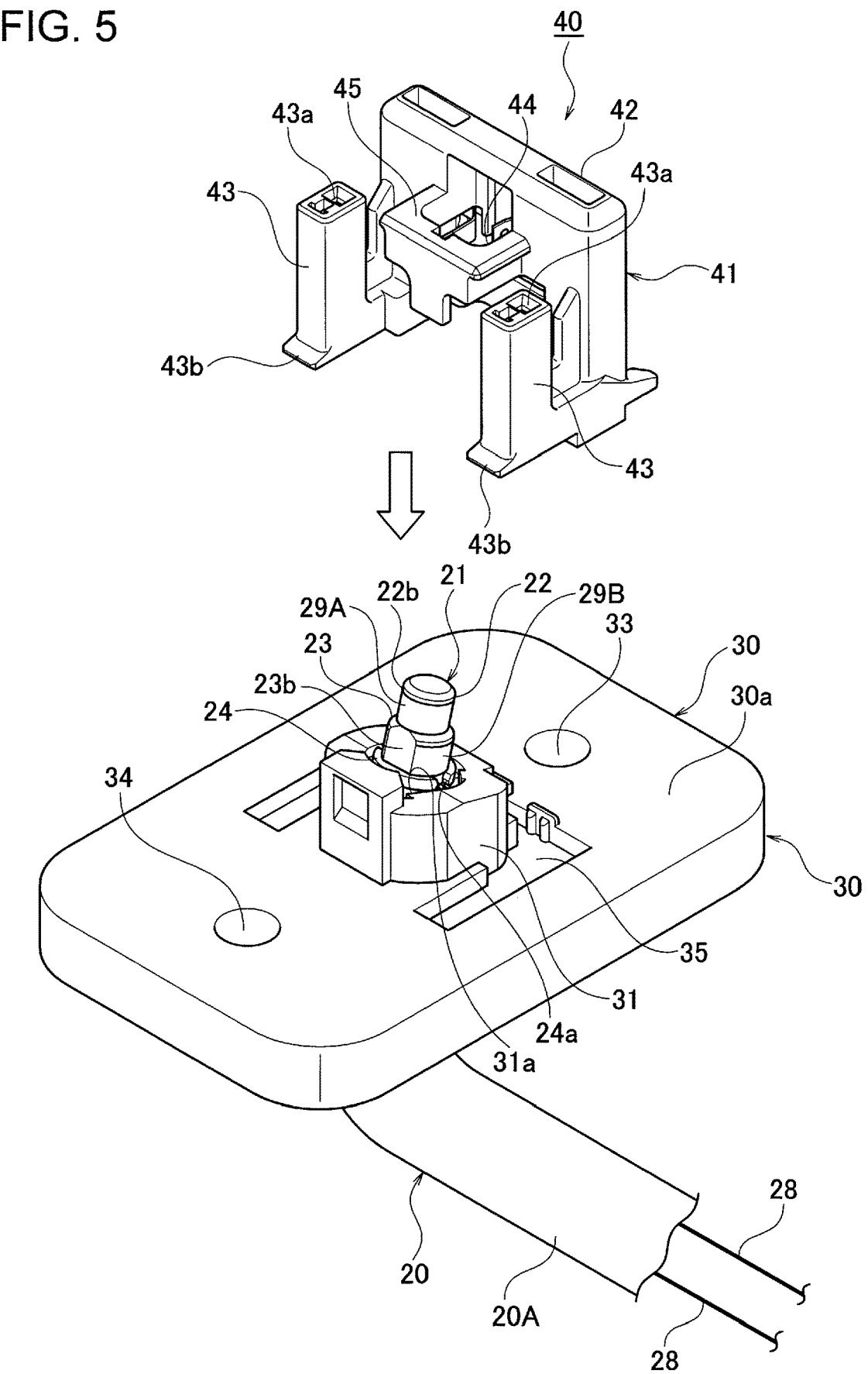
FIG. 5 is a perspective view showing a state before the connector is assembled to the mounting bracket to which the arm is attached.
Figure 6A:
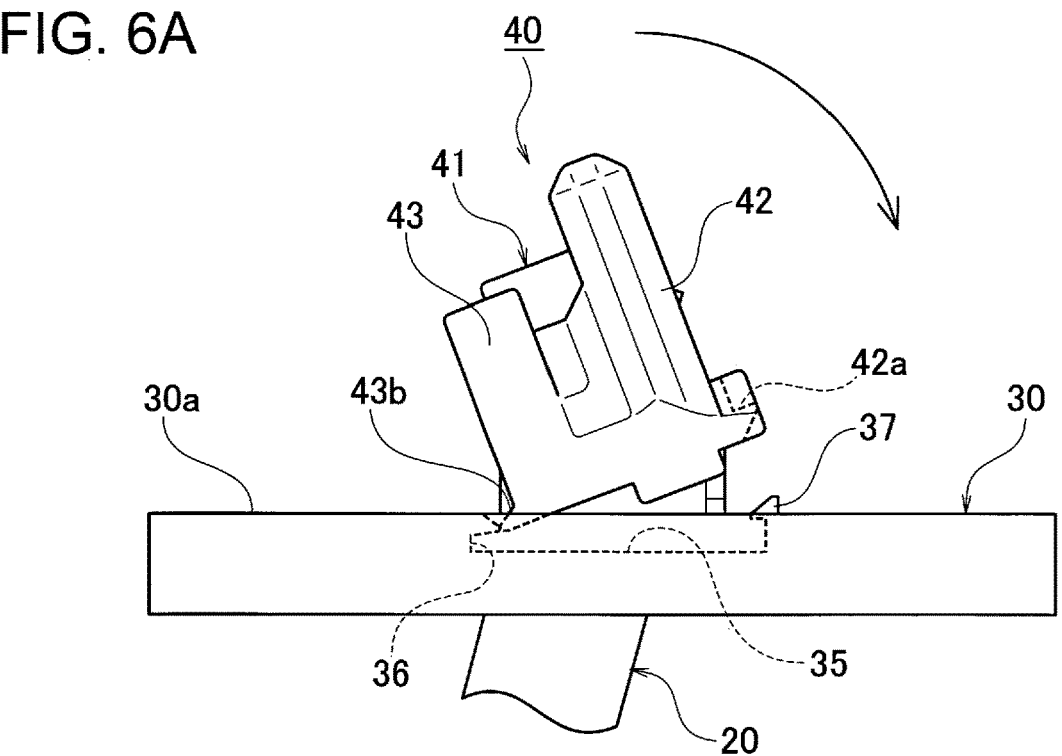
FIG. 6A is a side view showing a state in which the connector is being assembled to the mounting bracket.
Figure 6B:
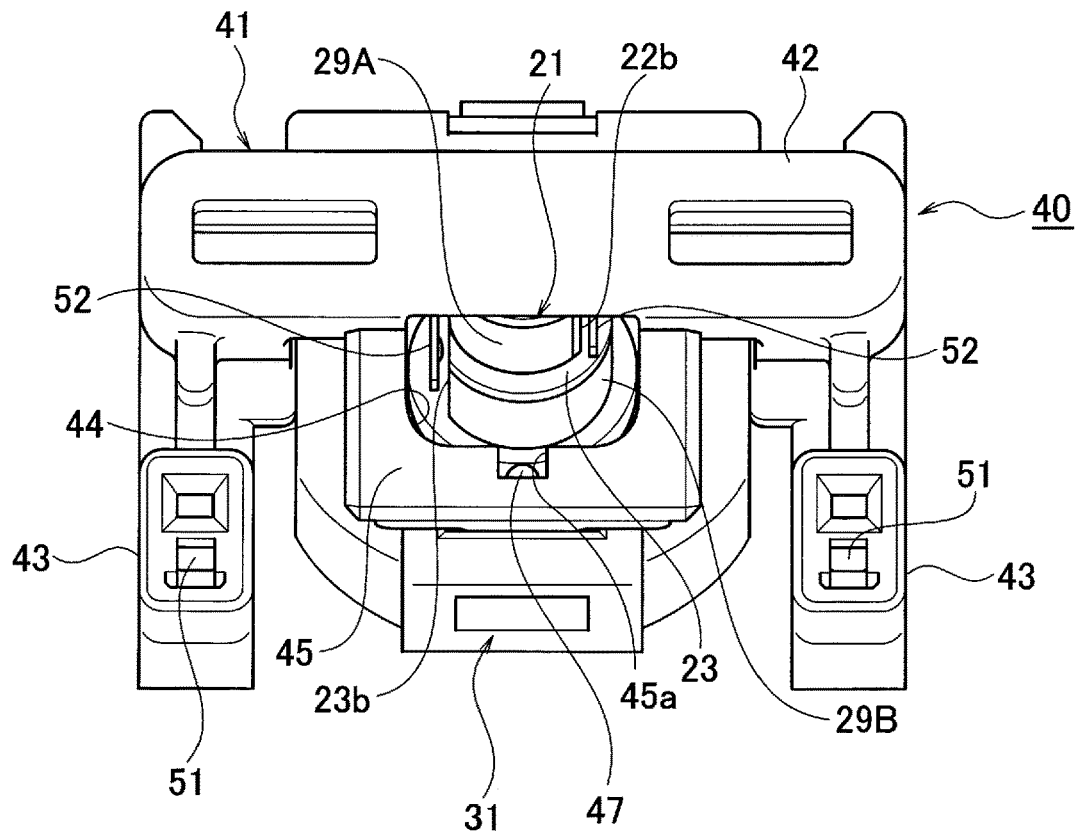
FIG. 6B is a plan view of the principal part in the state in which the connector is being assembled to the mounting bracket.
Figure 7A:
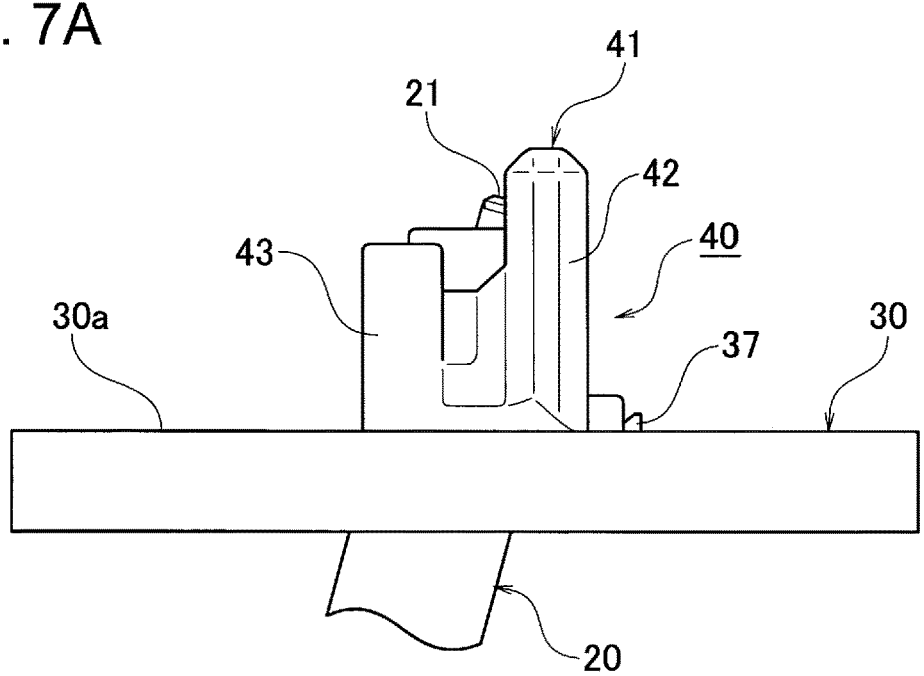
FIG. 7A is a side view showing a state in which the connector has been assembled to the mounting bracket.
Figure 7B:
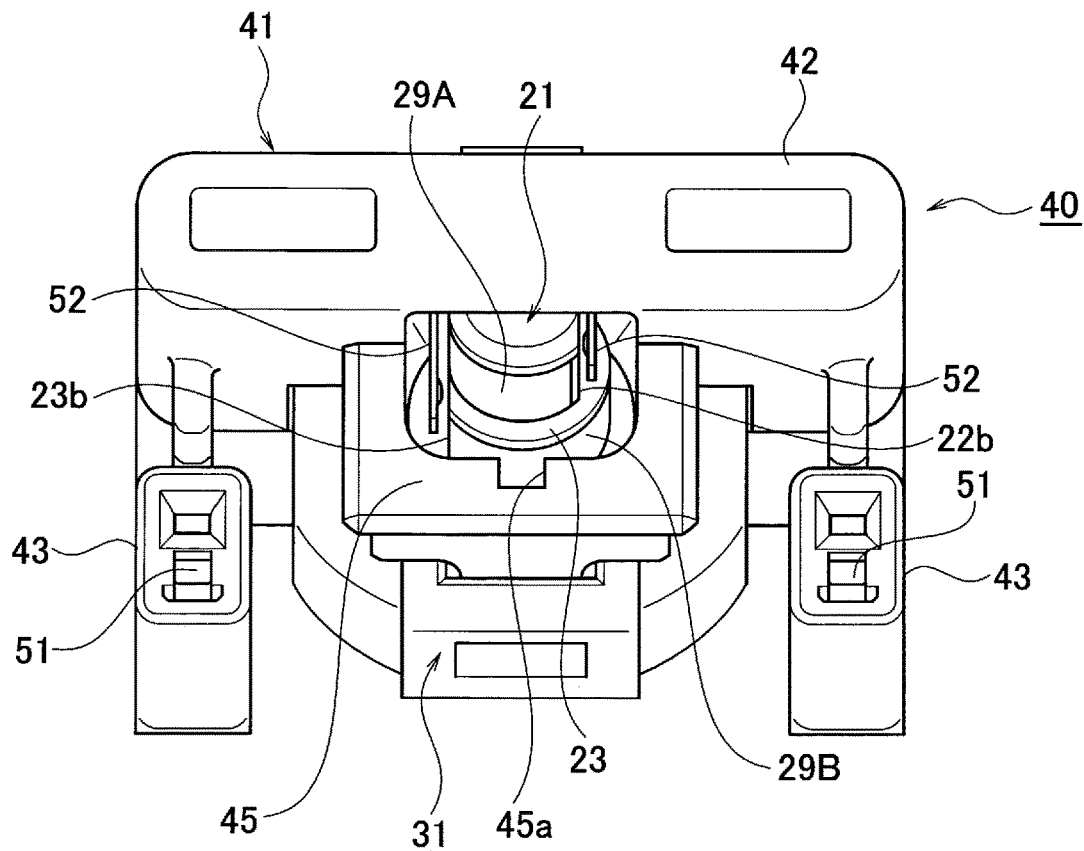
FIG. 7B is a plan view of the principal part in the state in which the connector has been assembled to the mounting bracket.
Figure 8:
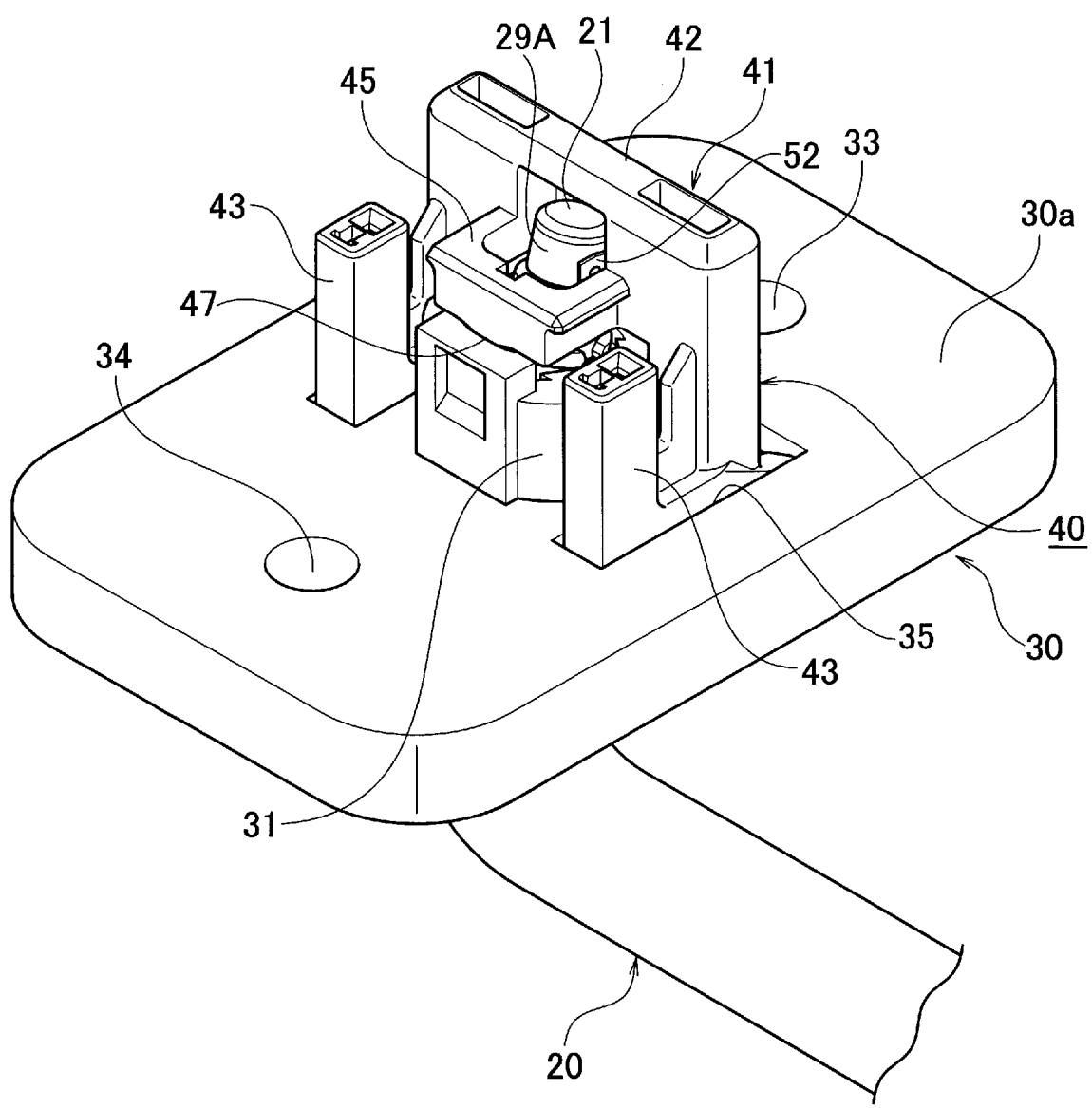
FIG. 8 is a perspective showing a state in which the connector has been assembled to the mounting bracket.
Figure 9A:
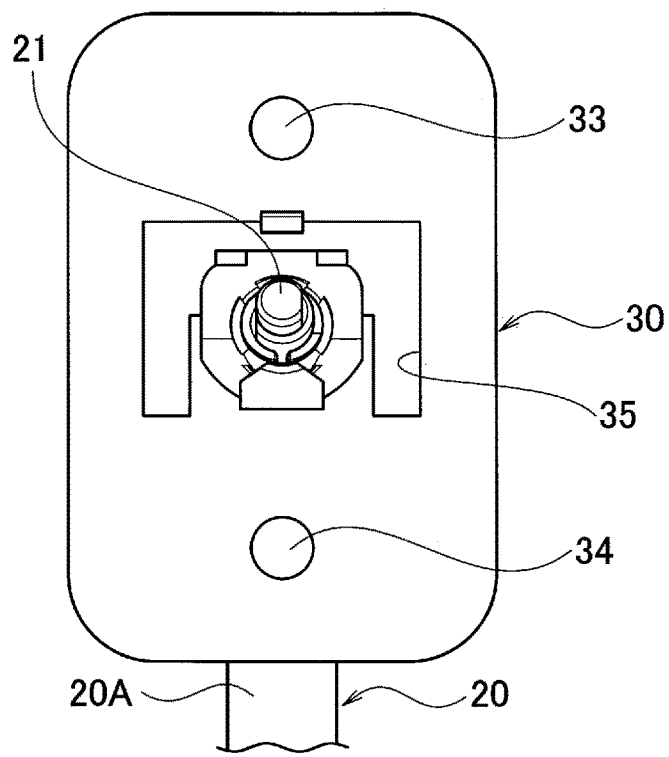
FIG. 9A is a plan view showing the positional relations between the mounting bracket and the arm when the connector is assembled.
Figure 9B:
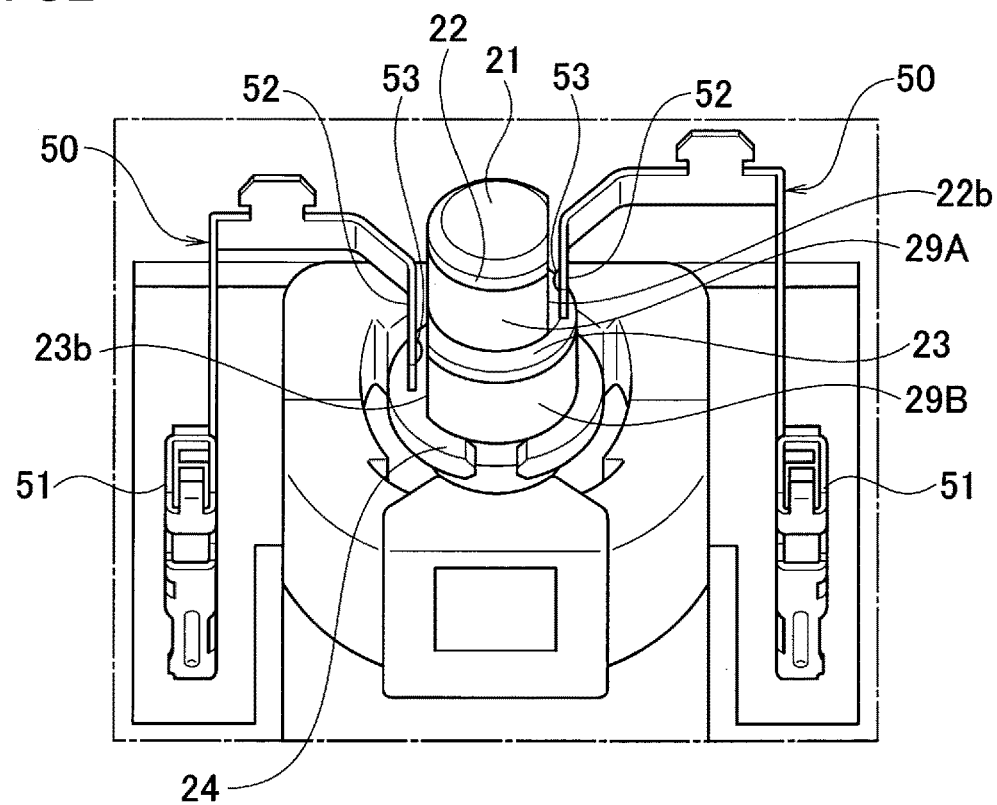
FIG. 9B is a plan view of the principal part in the state in which the connector has been assembled to the mounting bracket.
Figure 10A:
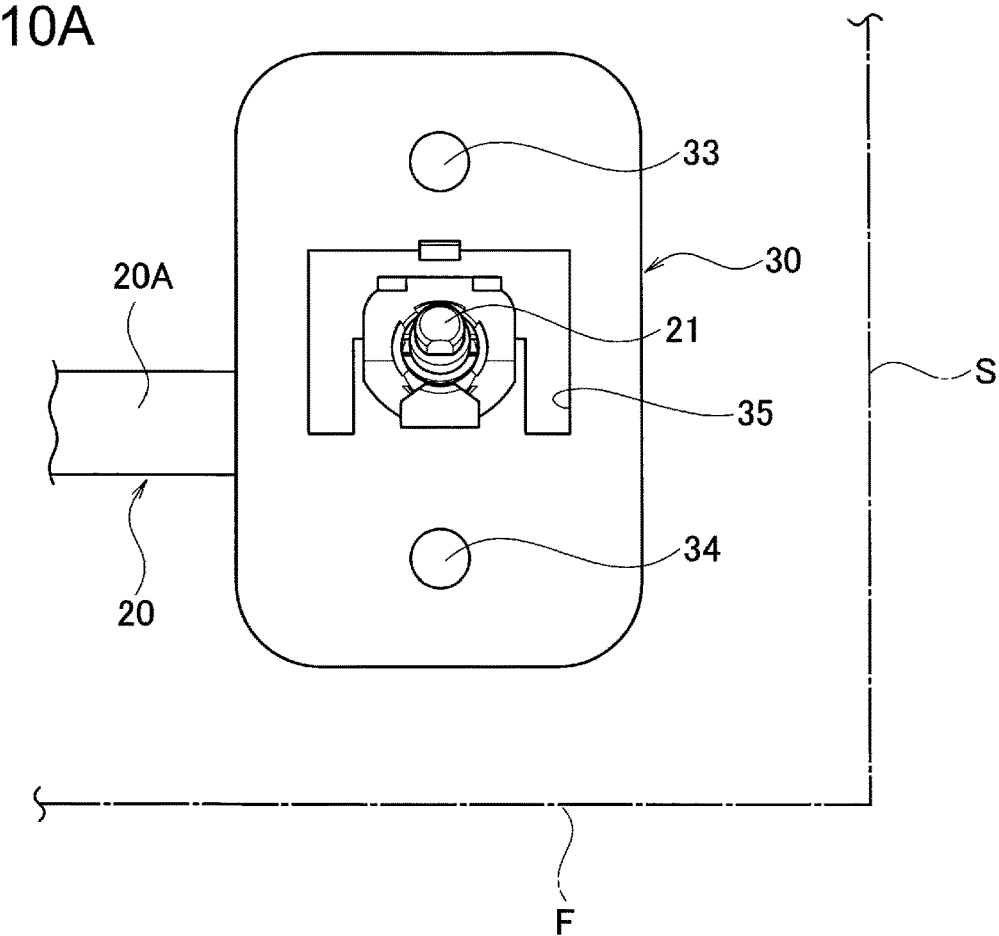
FIG. 10A is a plan view showing the positional relations between the mounting bracket and the arm when the sun visor is directed forward (front-window side)
Figure 10B:
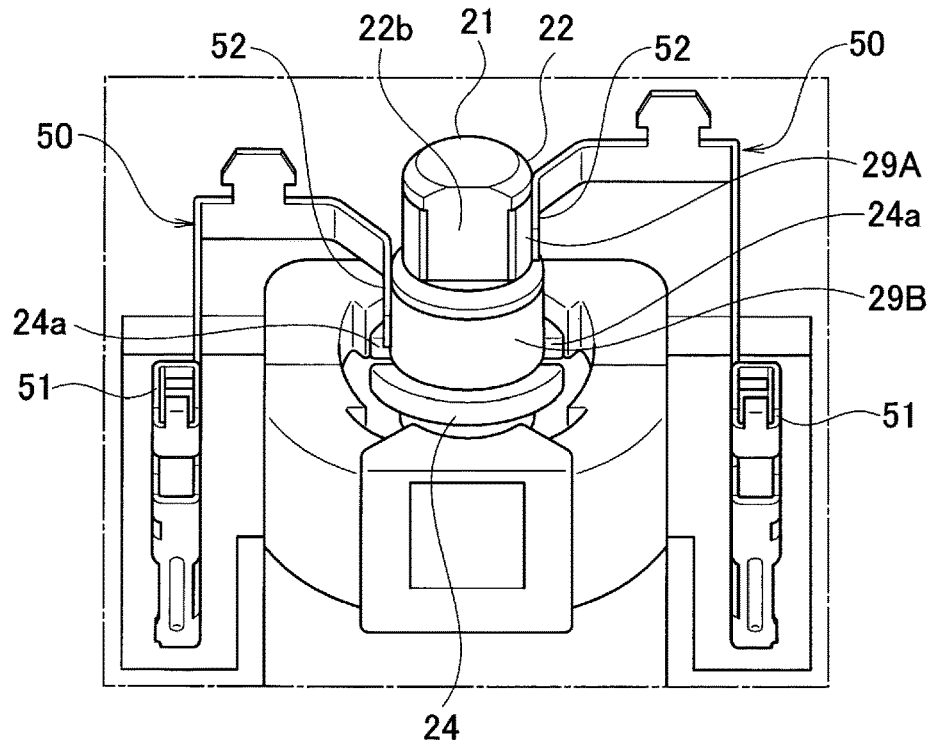
FIG. 10B is a plan view of a principal part when the sun visor is directed forward.
Figure 11A:
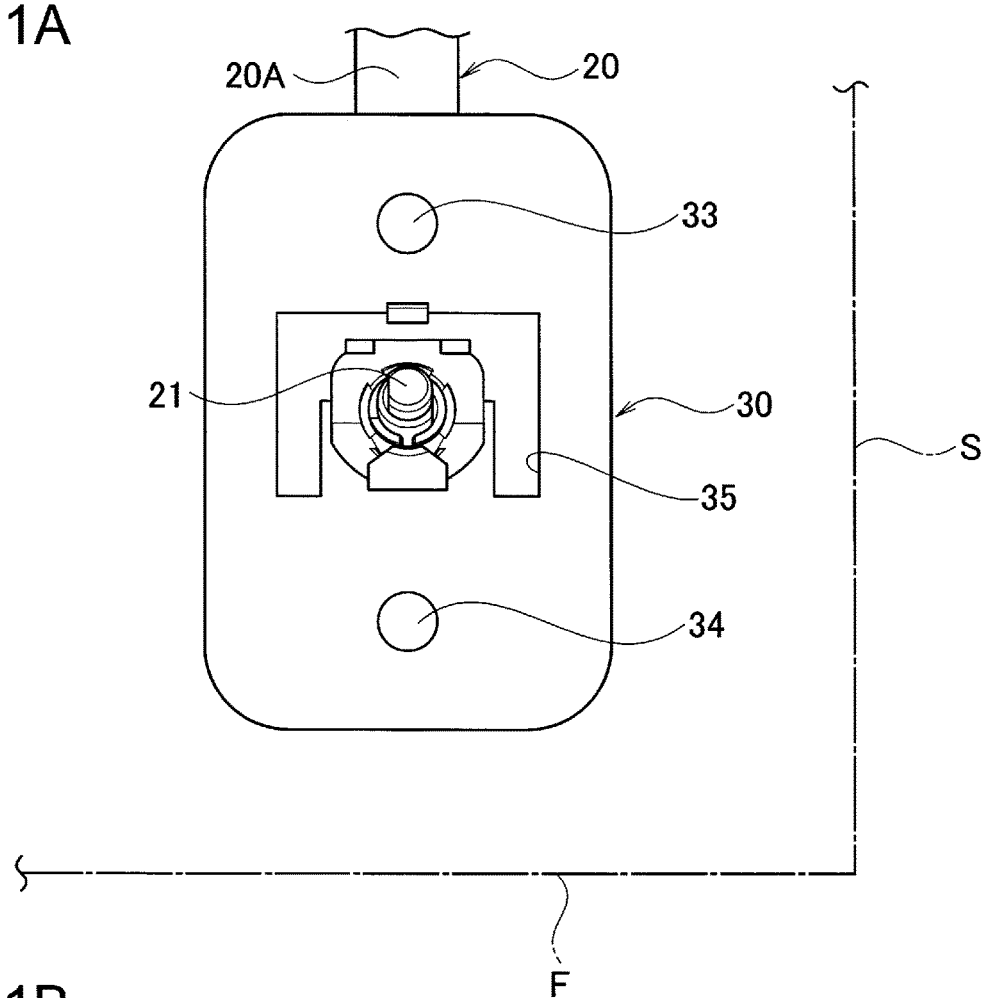
FIG. 11A is a plan view showing the positional relations between the mounting bracket and the arm when the sun visor is directed laterally (side-window side)
Figure 11B:
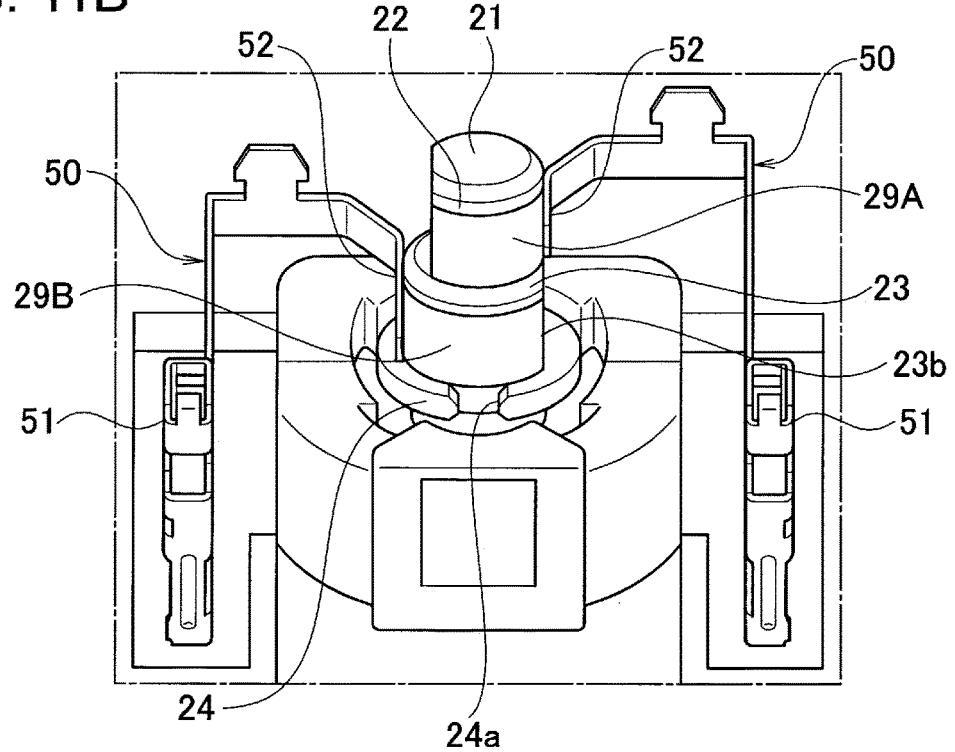
FIG. 11B is a plan view of a principal part when the sun visor is directed laterally.

FIG. 1 is a perspective view of a vehicle sun visor according to one embodiment of a first embodiment, FIG. 2 is a side view showing a state in which the vehicle sun visor is stored toward a ceiling of a cabin, FIG. 3A is a perspective view showing a state before the cylindrical-end portion of an arm is press-fitted to a mounting bracket of the vehicle sun visor, FIG. 3B is an enlarged side view of a cylindrical-end portion of the arm, FIG. 4 is a perspective view showing a state before a pair of terminals is inserted into a connector of the vehicle sun visor, FIG. 5 is a perspective view showing a state before the connector is assembled to the mounting bracket to which the arm is attached, FIG. 6A is a side view showing a state in which the connector is being assembled to the mounting bracket, FIG. 6B is a plan view of the principal part in the state in which the connector is being assembled to the mounting bracket, FIG. 7A is a side view showing a state in which the connector has been assembled to the mounting bracket, FIG. 7B is a plan view of the principal part in the state in which the connector has been assembled to the mounting bracket, FIG. 8 is a perspective view showing a state in which the connector has been assembled to the mounting bracket, FIG. 9A is a plan view showing the positional relations between the mounting bracket and the arm when the connector is assembled, FIG. 9B is a plan view of the principal part in the state in which the connector has been assembled to the mounting bracket, FIG. 10A is a plan view showing the positional relations between the mounting bracket and the arm when the sun visor is directed forward, FIG. 10B is a plan view of a principal part when the sun visor is directed forward, FIG. 11A is a plan view showing the positional relations between the mounting bracket and the arm when the sun visor is directed laterally, and FIG. 11B is a plan view of a principal part when the sun visor is directed laterally.

As shown in FIGS. 1 and 2, the vehicle sun visor 10 includes a sun visor body 11 having a vanity mirror (makeup mirror) 12 and an illumination lamp (electrical equipment) 13, a non-conductive arm 20 rotatably holding the sun visor body 11 and provided with each contact part 29A and 29B of a pair of conductors 28 and 28 at a cylindrical-end portion 21, a mounting bracket 30 for mounting the arm 20 to a roof trim (vehicle) 60, and a connector 40 detachably attached to the mounting bracket 30 and having a pair of terminals 50 and 50 for supplying electric power wherein the terminal has contact portion 53 being in contact with each contact part 29A and 29B of the pair of conductors 28 and 28.

As shown in FIGS. 3A and 5, the arm 20 is formed in a cylindrical shape with a synthetic resin. The arm 20 is formed so that the cylindrical-end portion 21 whose upper surface 21a is closed is inclined at a predetermined angle with respect to an arm body 20A. The pair of conductors 28 and 28 extending in parallel is routed inside the arm 20. The contact parts 29A and 29B of the arm 20 of the pair of conductors 28 and 28 are formed in an arcuate plate shape wherein the contact parts 29A and 29B are exposed toward the cylindrical-end portion 21 of the arm 20 and positioned at the cylindrical-end portion 21 (hereinafter referred to as "a pair of arcuate plate shape contact parts 29A and 29B"). Further, a small-diameter cylindrical-end portion 22 is provided on the upper side of a portion of the cylindrical-end portion 21 of the arm 20 wherein the portion is exposed outside the arm-supporting portion 31 of the mounting bracket 30 described below, and a large-diameter cylindrical-end portion 23 is provided on the lower side of the portion. Cutouts 22b and 23b are provided at alternate positions of the small-diameter cylindrical-end portion 22 and the large-diameter cylindrical-end portion 23, that is, the position of the cutout 22b on the small-diameter cylindrical-end portion 22 and the position of the cutout 23b on the large-diameter cylindrical-end portion 23 are opposed to each other in the diameter direction. First arcuate plate shape contact part 29A, which is one of the pair of arcuate plate shape contact parts 29A and 29B, is arranged in an annular recessed groove portion 22c formed on the outer peripheral surface 22a of the small-diameter cylindrical-end portion 22. Second arcuate plate shape contact part 29B, the other of the pair of arcuate plate shape contact parts 29A and 29B, is arranged in an annular recessed groove portion 23c formed on the outer peripheral surface 23a of the large-diameter cylindrical-end portion 23. A pair of cutouts 22b and 23b positioned alternately between the pair of arcuate-plate-shape contact parts 29A and 29B is a non-contact area between the pair of arcuate-plate-shape contact parts 29A and 29B and each contact portion 53 of the pair of terminals 50 and 50.

Further, as shown in FIGS. 3A and 5, an annular flange portion 24 to be engaged with an engaging protrusion 47 (described later) for assembling the connector 40 integrally protrudes and is formed on the lower side of the large-diameter cylindrical-end portion 23. Further, the annular recessed engagement groove 25 is integrally formed on the lower side of the annular flange portion 24. A cutout 24a for guiding the engaging protrusion 47 of the connector 40 is formed in the annular flange portion 24. An annular flange portion 26 having a diameter larger than that of the annular flange portion 24 integrally protrudes and is formed on the lower side of the annular flange portion 24. Further, the annular recessed engagement groove 27 is integrally formed on the lower side of the flange portion 24.

As shown in FIGS. 1 to 3 and FIGS. 5 to 11B, the mounting bracket 30 is made of a synthetic resin. A tubular arm-supporting portion 31 having a circular inner peripheral surface 31a rotatably supporting the cylindrical-end portion 21 of the arm 20 is integrally protruded and formed at the center of the mounting bracket 30. As shown in FIGS. 3A and 5, the cylindrical-end portion 21 of the arm 20 is press-fitted to the inner peripheral surface 31a of the arm-supporting portion 31, and a locking protrusion 32 protruding from the inner peripheral surface 31a enters the annular recessed engagement groove 27 of the arm 20, and is engaged with the annular flange portion 26. Accordingly, the upper side of the cylindrical-end portion 21 of the rotating arm 20 protrudes outside the arm-supporting portion 31 such that the upper side is exposed.

As shown in FIG. 5, a recess 35 for assembling the connector is formed on both sides of the arm-supporting portion 31 on the upper surface 30a of the mounting bracket 30 and toward a mounting hole 33 of the mounting bracket 30. An engagement hole 36 into which a locking piece portion 43b of both side walls 43 and 43 of the connector 40 is fitted is formed on both sides of the recess 35 for assembling the connector toward a mounting hole 34, which is opposite the side of the mounting hole 33. In addition, as shown in FIGS. 5 and 6, a locking claw portion 37 to which the locking piece portion 42a of a housing body 42 of the connector 40 is locked is formed at the center of the recess 35 for assembling the connector toward the mounting hole 33. The mounting bracket 30 is screwed to a roof trim 60 by screws (not shown) via a pair of mounting holes 33 and 34.

As shown in FIG. 4, a housing 41 of the connector 40 is made of a synthetic resin. This housing 41 includes the housing body 42, a pair of side walls 43 and 43 having a L-shaped terminal receiving chamber 43b on both sides of the housing body 42, and a center wall 45 where a hollow portion 44 is formed between the center wall 45 and the center of the housing body 42. As shown in FIG. 5, when the housing 41 is assembled in the recess 35 for assembling the connector so that the pair of side walls 43 and 43 of the housing 41 is positioned on both sides of the arm-supporting portion 31 of the mounting bracket 30, as shown in FIG. 8, the cylindrical-end portion 21 of the arm 20 is exposed in the hollow portion 44 between the housing body 42 and the center wall 45.

In addition, as shown in FIGS. 4 to 6B, a rectangular cutout 45a is formed in the center of the center wall 45 of the connector 40 toward the hollow portion 44. As shown in FIG. 6B, an engaging protrusion 47 for assembling integrally protrudes and is formed on the lower side of the cutout 45a. As shown in FIG. 6B, when the cylindrical-end portion 21 of the arm 20 is not located at the correct assembling position, the engaging protrusion 47 for assembling the housing 41 cannot enter the annular recessed engagement groove 25 of the arm 20 from the cutout 24a of the annular flange portion 24. That is, if the cylindrical-end portion 21 of the arm 20 is not located at the correct assembling position, it is impossible to attach the connector 40 to the mounting bracket 30. After assembling the connector 40 to the mounting bracket 30, the engaging protrusion 47 is engaged with the annular flange portion 24 by the rotation of the arm 20, so that the arm 20 is held by the housing 41.

As shown in FIG. 4, each terminal 50 whose distal end is a box-shaped terminal connection part 51 is formed in an L-shaped plate shape and housed in the L-shaped terminal receiving chamber 43a of the side wall 43 of the housing 41. In addition, the L-shaped plate spring portion 52 connected to the terminal connection part 51 of each terminal 50 is formed to be elastically deformable. In addition, the distal end of the spring portion 52 is provided with the semicircular spherical contact portion 53.

As shown in FIG. 6B, each spring portion 52 of the pair of terminals 50 and 50 and the pair of arcuate plate shape contact parts 29A and 29B are positioned in the hollow portion 44 between the housing body 42 and the center wall 45 of the housing 41. The spring portions 52 are arranged opposite to each other, and the arcuate plate shape contact parts 29A and 29B are arranged opposite to each other.

As shown in FIG. 2, the connector 40 is adapted to be fitted into a connector 62 connected to a power supply connection wire 61 toward the roof trim 60. At the time of this fitting, each terminal connection part 51 of the pair of terminals 50 and 50 of the connector 40 and the pair of terminals (not shown) of the connector 62 toward the roof trim 60 are electrically connected, and electric power is supplied to the pair of terminals 50 and 50 of the connector 40.

Further, when the sun visor body 11 is folded in front of the front window F as shown in FIG. 10A, and when the sun visor body 11 is folded to the side of the side window S as shown in FIG. 11A, positional relations of the arm 20 with respect to the mounting bracket 30 changes. That is, in FIGS. 10A and 11A, the arm main body 20A extends from the arm-supporting portion 31 of the mounting bracket 30 are different from each other. However, regardless of the positional relations, the pair of arcuate plate shape contact parts 29A and 29B provided on the outer peripheral surfaces 22a and 23a of the small-diameter and large-diameter cylindrical-end portions 22 and 23 is brought into contact (conducting) with the contact portion 53 of each spring portion 52 of the pair of terminals 50 and 50 for supplying electric power to be in a conducting (ON) state. That is, the conductive circuit connecting the pair of conductors 28 and 28 routed in the arm 20 and the illumination lamp 13 of the sun visor body 11 is in a conducting state, whereby the lighting preparation state of the illumination lamp 13 of the sun visor body 11 is generated. In this lighting preparation state, when a cover (slide member) 14 covering a vanity mirror 12 of the sun visor body 11 is opened by sliding, the switch mechanism (not shown) is turned on, and the illumination lamp 13 is turned on. Generally, when the sun visor body is folded to the side of the side window, the contact part toward the arm is away from the contact portion of the terminal for supplying electric power to becomes non-conductive, so that the conductive circuit of the illumination lamp is in a non-conducting (OFF) state. However, in the first embodiment, even when the sun visor body 11 is folded to the side of the side window S, the pair of arcuate plate shape contact parts 29A and 29B contacts each contact portion 53 of the pair of terminals 50 and 50 for supplying electric power, and the conductive circuit of the illumination lamp 13 is always in a conducting state except when the connector 40 is assembled to the mounting bracket 30.

According to the vehicle sun visor 10 of the first embodiment as described above, when the vehicle sun visor 10 is assembled, first, as shown in FIGS. 3A and 3B, the cylindrical-end portion 21 of the arm 20 is press-fitted to a circular inner peripheral surface 31a formed obliquely in the arm-supporting portion 31 of the mounting bracket 30. By this press-fitting, as shown in FIG. 5, the locking protrusion 32 protruding from the inner peripheral surface 31a of the arm-supporting portion 31 enters the annular recessed engagement groove 27 of the arm 20, and is engaged with the annular flange portion 26, and the cylindrical-end portion 21 of the arm 20 is rotatably supported on the arm-supporting portion 31.

Next, as shown in FIG. 4, after the pair of terminals 50 and 50 is inserted into the housing 41 of the connector 40, as shown in FIG. 5, cutouts 22b and 23b of the small-diameter and large-diameter cylindrical-end portion 22 and 23 of the arm 20, wherein the small-diameter and large-diameter cylindrical-end portion 22 and 23 is exposed outside the arm-supporting portion 31 of the mounting bracket 30, is positioned to be faced with the both side walls 43 and 43 of the connector 40. In this state, as shown in FIGS. 6A and 6B, the pair of locking piece portions 43b and 43b provided on the both side walls 43 and 43 of the housing 41 of the connector 40 is inserted into the pair of engagement holes 36 and 36 provided in the recess 35 for assembling the connector wherein the recess is provided on the upper surface 30a of the mounting bracket 30, and the connector 40 is rotated to lock the locking piece portion 42a of the housing body 42 of the connector 40 to the locking claw portion 37 of the recess 35 for assembling the connector, as shown by the arrow in FIG. 6A, so that the connector 40 is attached to the upper surface 30a of the mounting bracket 30.

At this time, as shown in FIGS. 7B and 9B, each spring portion 52 having the contact portion 53 of the pair of terminals 50 and 50 assembled to the connector 40 passes the vicinity of the cutouts 22b and 23b of the small-diameter and large-diameter cylindrical-end portions 22 and 23 of the cylindrical-end portion 21 of the arm 20. Therefore, the connector 40 can be assembled to the mounting bracket 30 while each spring portion 52 does not contact the pair of arcuate plate shape contact parts 29A and 29B on the outer peripheral surfaces 22a and 23a of the small-diameter and large-diameter cylindrical-end portions 22 and 23. As a result, there is no interference between the pair of arcuate-plate-shape contact parts 29A and 29B and the contact portion 53 of each spring portion 52 of the pair of terminals 50 and 50, and deformation of each spring portion 52 of the pair of terminals 50 and 50 can be reliably prevented.

The arcuate plate shape contact parts 29A and 29B are provided on the outer peripheral surface 22a of the small-diameter cylindrical-end portion 22 on the upper side of the arm 20 exposed outside the arm-supporting portion 31 of the mounting bracket 30 and the outer peripheral surface 23a of the large-diameter cylindrical-end portion 23 on the lower side of the arm 20 exposed outside the arm-supporting portion 31 of the mounting bracket 30, so that it is possible to widen the contact range (rotation angle of the arm 20) between the arcuate plate shape contact parts 29A and 29B serving as the contact part of the conductor 28 of the arm 20 and the contact portion 53 of the terminal 50. As shown in FIG. 2, when the sun visor body 11 is stored toward the roof trim 60, as shown in FIG. 10A, when the sun visor body 11 is folded in front of the front window F, and as shown in FIG. 11A, when the sun visor body 11 is folded to the side of the side window S, the pair of arcuate plate shape contact parts 29A and 29B of the arm 20 and each contact portion 53 of the pair of terminals 50 and 50 can be always in a contacting state. Furthermore, the cutouts 22b and 23b are provided in alternate positions of the small-diameter cylindrical-end portion 22 and the large-diameter cylindrical-end portion 23, so that deformation of the spring portion 52 of the terminal 50 can be reliably prevented when the connector 40 is assembled to the mounting bracket 30 with the arm 20 assembled thereto.

Figure 12:
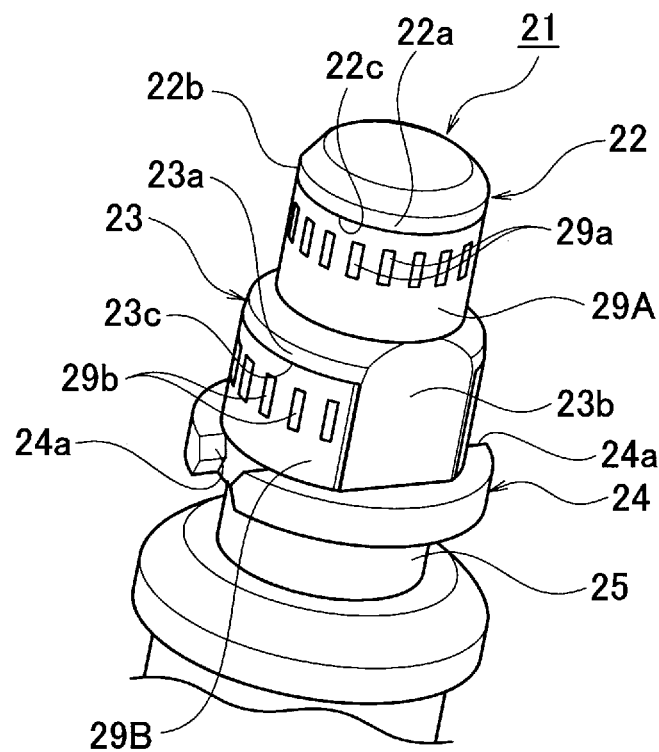
FIG. 12 is a perspective view showing a cylindrical-end portion of an arm of a vehicle sun visor according to a second embodiment of the present invention.
Figure 13:
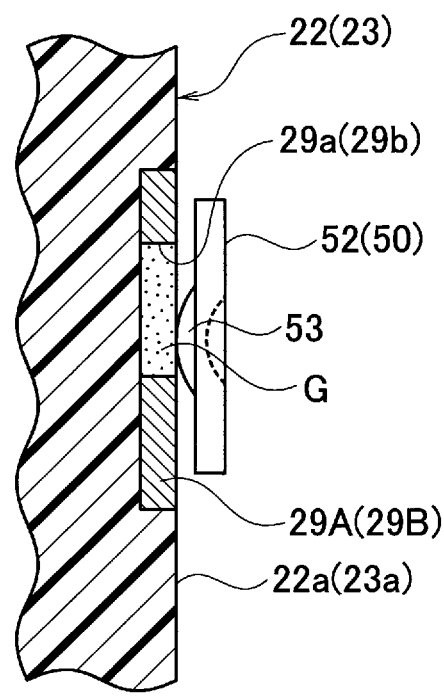
FIG. 13 is an enlarged section view of a principal part of the cylindrical-end portion of the arm.
Figure 14:
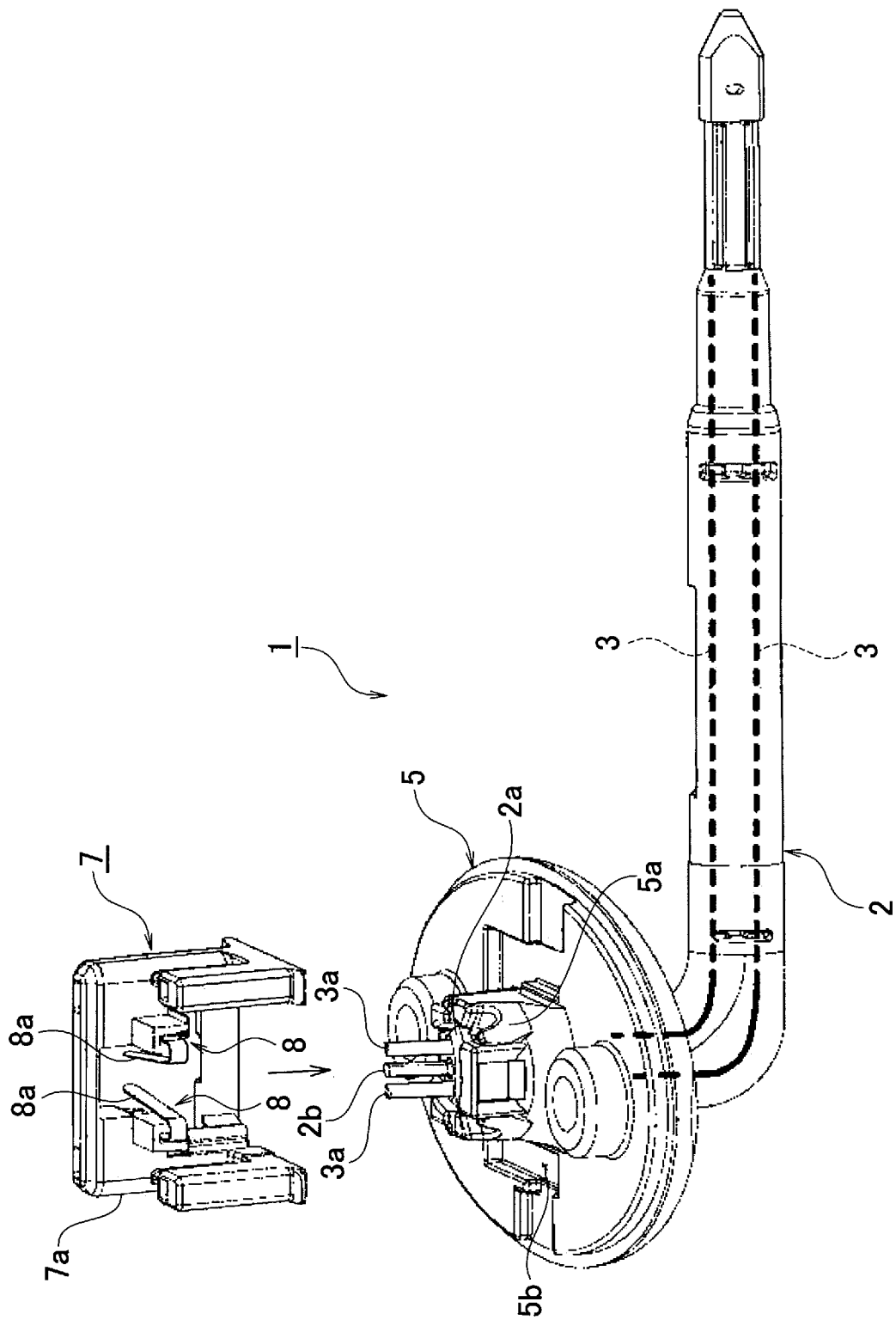
FIG. 14 is a perspective view showing a periphery of a mounting bracket of a conventional vehicle sun visor.

FIG. 12 is a perspective view showing a cylindrical-end portion of an arm of a vehicle sun visor according to a second embodiment of the present invention, and FIG. 13 is an enlarged section view of a principal part of the cylindrical-end portion of the arm.

As shown in FIGS. 12 and 13, slits 29a and 29b for storing lubricating oil are longitudinally pierced at positions of the pair of arcuate plate shape contact parts 29A and 29B wherein the contact portion 53 provided on the distal end of the spring portion 52 of the terminal 50 is in contact with the pair of arcuate plate shape contact parts 29A and 29B at the position wherein the arcuate plate shape contact parts 29A and 29B are provided on the outer peripheral surface 22a of the small-diameter cylindrical-end portion 22 and the outer peripheral surface 23a of the large-diameter cylindrical-end portion 23 of the cylindrical-end portion 21 of the arm 20. Paste-like grease (lubricating oil) G to be supplied to the contact portion 53 of the terminal 50 is stored in the slits 29a and 23b. That is, the grease G is stored in the elongated slits 29a, 29b and the grease G moves downward by its own weight, so that the grease G is always supplied to the contact portion 53 of the spring portion 52 of the terminal 50. Since other configurations are similar to those of the first embodiment, the same components are denoted by the same reference numerals, and a detailed description thereof will be omitted.

According to the second embodiment, as shown in FIG. 13, paste-like grease G filling elongated slits 29a and 29b of a pair of arcuate plate shape contact parts 29A and 29B is attached to each contact portion 53 of the pair of terminals 50 and 50, so that it is possible to protect the contact parts 29A, 29B, and the contact portion 53 from abrasion due to their sliding. In addition, even when the arm 20 is repeatedly rotated, the grease G always moves and adheres to the contact portion 53 of the terminal 50 due to its own weight, so that the grease G does not disappear by sliding and the grease G is always supplied to the contact portion 53. Thus, it is possible to reliably suppress sliding wear between the contact parts 29A, 29B, and the contact portion 53.

According to each of the above embodiments, the sun visor body is provided with an illumination lamp as an electrical component. The sun visor body may be provided with a compact and thin liquid crystal monitor or the like as an electrical component.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A vehicle sun visor comprising:
    a sun visor body including an electrical component;
    a non-conductive arm comprising a cylindrical-end portion on which contact parts of a pair of conductors are arranged and rotatably holding the sun visor body;
    a mounting bracket configured to mount the non-conductive arm to a vehicle; and
    a connector detachably attached to the mounting bracket and including a pair of terminals each having a contact portion to contact with a corresponding contact part of the pair of conductors and configured to supply electric power, wherein
    the mounting bracket comprises an arm-supporting portion for rotatably supporting a cylindrical-end-portion side of the non-conductive arm,
    the contact parts of the pair of conductors are formed in an arcuate plate shape,
    the cylindrical-end portion exposed outside the arm-supporting portion comprises a small-diameter cylindrical-end portion provided on the upper side and a large-diameter cylindrical-end portion provided on the lower side,
    cutouts are provided at alternate positions of the small-diameter cylindrical-end portion and the large-diameter cylindrical-end portion, and
    first arcuate plate shape contact part, which is one of the pair of arcuate plate shape contact parts, is arranged on an outer peripheral surface of the small-diameter cylindrical-end portion, and second arcuate plate shape contact part, which is the other of the pair of arcuate plate shape contact parts, is arranged on an outer peripheral surface of the large-diameter cylindrical-end portion.

2. The vehicle sun visor according to claim 1, wherein slits configured to store lubricating oil are longitudinally provided at positions of the arcuate plate shape contact parts wherein the contact portion of the terminals are in contact with the arcuate plate shape contact parts at the position, and lubricating oil to be supplied to the contact portion of the terminals is stored in the slits.

\* \* \* \* \*